H. H. AND L. E. GREISCHAR.
BICYCLE STAND HOLDER.
APPLICATION FILED MAR. 25, 1919.
1,332,826.
Patented Mar. 2, 1920.
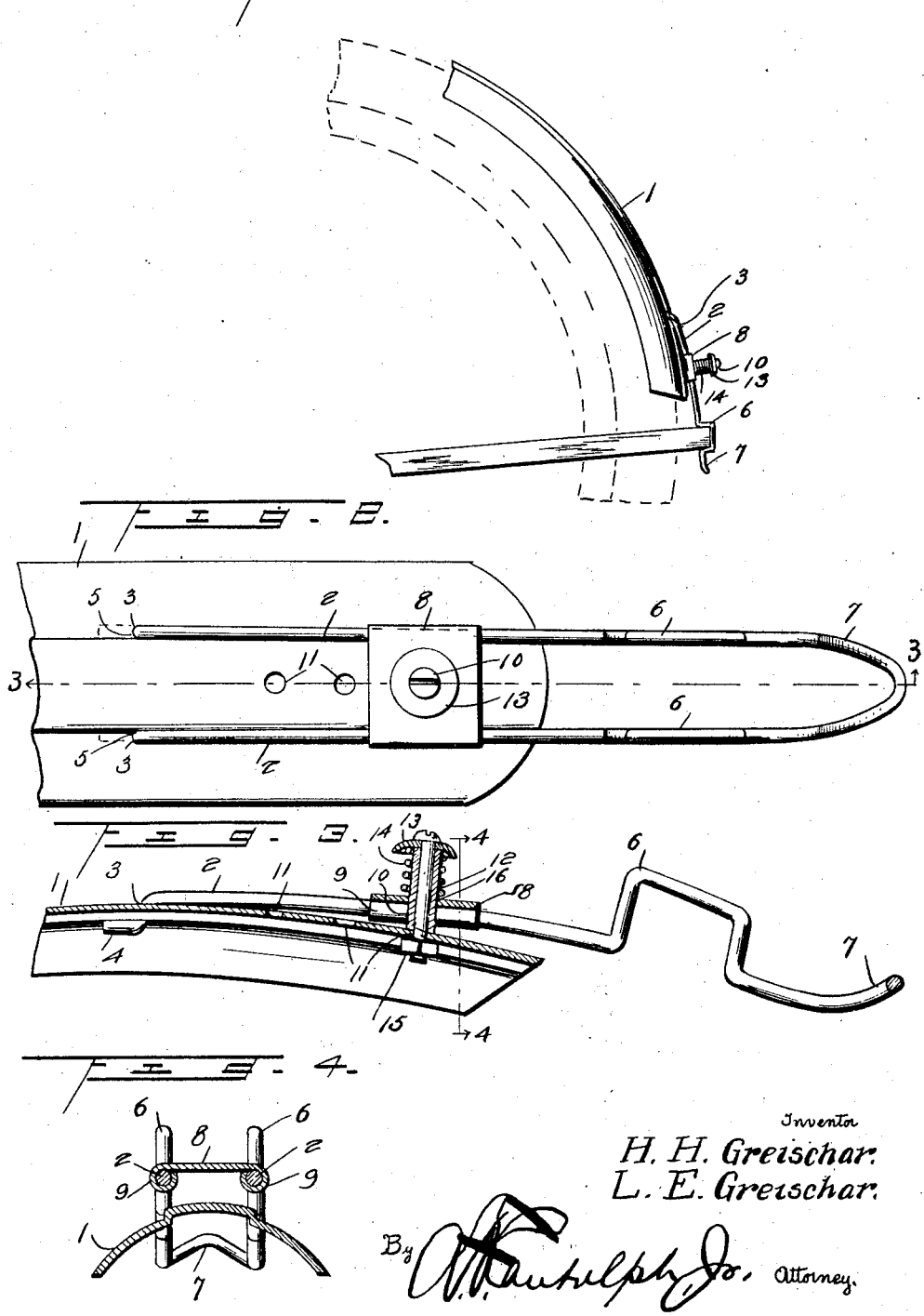
Inventor
H. H. Greischar.
L. E. Greischar.

UNITED STATES PATENT OFFICE.

HENRY H. GREISCHAR AND LEONARD E. GREISCHAR, OF ST. JAMES, MINNESOTA.

BICYCLE-STAND HOLDER.

1,332,826.   Specification of Letters Patent.   Patented Mar. 2, 1920.

Application filed March 25, 1919. Serial No. 285,091.

*To all whom it may concern:*

Be it known that we, HENRY H. GREISCHAR and LEONARD E. GREISCHAR, citizens of the United States, residing at St. James, in the county of Watonwan and State of Minnesota, have invented certain new and useful Improvements in Bicycle-Stand Holders; and we do hereby declare the following to be a full, clear, and exact description of the invention, such as will enable others skilled in the art to which it appertains to make and use the same.

This invention relates to bicycle stand holders, and more particularly to a holding device for use in connection with motorcycles and bicycles for holding the usual stand therefor in raised position.

One of the main objects of the invention is to provide a holding device of the character stated of simple construction and operation which may be produced at small cost and may be readily applied.

A further object is to provide a holding device in which all looseness or play, and consequent rattling and noise, is eliminated.

Another object is to provide a device in which the holding elements thereof may be held securely in engagement with the stand, the means for holding this holding element in operative position being adjustable so as to vary the amount of pressure exerted thereby to suit circumstances.

Further objects will appear from the detailed description.

In the drawings:

Figure 1 is a side view of a stand holder constructed in accordance with our invention as applied, showing fragmentarily the wheel fender and a bicycle stand supported in raised position.

Fig. 2 is a plan view of the holding device.

Fig. 3 is a section taken substantially on line 3—3 of Fig. 2.

Fig. 4 is a section on line 4—4 of Fig. 3.

This holder is adapted to be applied to the lower end portion of a wheel guard or fender of the usual construction indicated by 1. In constructing the holder, we bend a suitable length of relatively heavy wire so as to form a substantially elongated U-shaped frame, each arm 2 of which is bent downwardly adjacent its forward end to provide a shoulder 3 and an offset finger 4. The shoulders 3 engage through spaced apertures 5 provided through the fender for this purpose, fingers 4 being positioned beneath the fender so as to secure the upper ends thereof against outward movement, the shoulders serving to prevent longitudinal movement of the arms 2 in either direction. Each arm 2 is bent, a short distance from its lower end, to provide a substantially U-shaped gripping and retaining element 6, and the outer end of the frame is bent outwardly and upwardly slightly as at 7 to permit the stand A, which may be of any suitable or preferred construction, to be readily moved into raised position.

A plate 8 of sheet metal is mounted upon arms 2, this plate being provided at each end with an integral sleeve 9 which fits snugly about these arms so as to slidably support the plate thereon. A securing screw 10 is inserted through plate 8 and through any one of a series of openings 11, selectively, provided through the central portion of fender 1. A spacing sleeve 12 is mounted about the upper portion of this screw and is confined between the fender and a suitable washer 13 positioned adjacent the head of the screw. An expansion coil spring 14 is mounted about this sleeve and confined between the plate and washer, this spring acting to force the U frame member downwardly toward the fender, the screw being positively secured against outward movement by a suitable nut 15 screwed on the inner end thereof. As will be noted, the spring acts to normally hold the U frame in depressed position. When the stand A is raised, it moves the holder outwardly against the action of the spring, the connections between the upper end of this frame and the fender being sufficiently loose to permit this movement, so as to permit the lower bar of the stand to pass into such position as to be engaged by the U members 6. When the lower bar of the stand reaches this position, the frame will be returned to its initial position by the action of the expansion spring, thus holding the stand in raised or inoperative position. During this rocking movement of the U frame of the holder, the plate 8 will have slight sliding movement longitudinally of the arms 2, for which purpose the opening 16 through this plate for receiving sleeve 2 of substantial elliptical shape having its longer axis disposed longitudinally of the fender, as in Fig. 3. The expansion spring acts to hold the U holding frame securely in position and to prevent all looseness or rattling thereof while effectually maintaining the stand raised. By varying the position of the plate 8, by removing nut 15 and inserting the screw 10 through any one of the apertures 11, selectively, the amount of downward pressure exerted by the expansion spring upon the holding frame at the U members 6 thereof may be varied to suit conditions, this pressure increasing in accordance with movement of the spring toward the members 6. Also, when desired or necessary, the holding device may be readily removed from the fender by the simple expedient of removing nut 15 so as to release the screw, and then rocking the U frame upwardly slightly and withdrawing fingers 4 through the apertures 5 therefor.

It will be evident that there may be slight changes made in the construction and arrangement of the details of our invention without departing from the field and scope of the same, and we intend to include all such variations, as fall within the scope of the appended claims, in this application in which a preferred form only of our invention is disclosed.

What we claim is:

1. The combination with a fender, of a holding frame loosely and detachably secured thereto at its upper end, said frame being provided adjacent its lower end with a substantially U-shaped member for reception of the end bar of a stand so as to hold the stand in raised position, a plate secured on said frame, a securing screw extending through said plate and the fender and secured against outward movement, a washer carried by said screw adjacent the head thereof, and an expansion coil spring mounted about the screw and confined between said washer and plate and acting to force the holding frame toward the fender, said screw acting to prevent detachment of the upper end of the holding frame from the fender.

2. The combination with a fender provided with a longitudinal series of openings, of a substantially U-shaped holding frame having the upper end portions of its arms bent to provide offset fingers and intermediate shoulders, said fingers and shoulders being loosely inserted through the fender so as to loosely and detachably secure the holding frame thereto for movement toward and away from the fender, and the arms of said holding frame being provided with substantial U-shaped elements adapted to receive the end bar of a stand so as to hold it in raised position, a plate slidably mounted on the arms of said frame, a securing screw inserted through said plate and adapted to be secured through any one of said openings, selectively, a washer carried by said screw adjacent the head thereof, a sleeve mounted about the screw and extending through said plate confined between said washer and the fender so as to prevent movement of the screw in either direction, and an expansion spring mounted about said sleeve and confined between the washer and plate for forcing the holding frame inwardly and holding it normally tightly in engagement with the fender.

3. The combination with a wheel fender, of a supporting frame having side arms loosely connected with the fender, the frame being offset intermediate its length to provide a guard receiving pocket, a cross plate connecting the side arms, a pin carried by the fender and extending through an opening formed in the cross plate, a sleeve positioned about the pin, an abutment carried by the pin between the sleeve and the outer end of the pin, and resilient means positioned about the sleeve between the cross plate and abutment for yieldably holding the frame in a normal position and retaining the frame in engagement with the fender.

4. The combination with a fender, of a stand supporting frame having side arms loosely engaging the fender for pivotal movement into and out of operative engagement with the stand, a pin carried by the fender and extending through the frame and provided with abutments adjacent its outer end, and resilient means positioned between the abutment and frame for yieldably retaining the frame in a normal position and preventing movement of the frame out of pivotal engagement with the fender.

In testimony whereof we affix our signatures in presence of two witnesses.

HENRY H. GREISCHAR.
LEONARD E. GREISCHAR.

Witnesses:
EARNIE SMITH,
THOMAS SMITH.